US011629279B2

(12) United States Patent
George et al.

(10) Patent No.: US 11,629,279 B2
(45) Date of Patent: Apr. 18, 2023

(54) AZEOTROPE OR AZEOTROPE LIKE COMPOSITIONS COMPRISING 1234YF

(71) Applicant: SRF LIMITED, Gurgaon (IN)

(72) Inventors: Jose George, Gurgaon (IN); Sunil Raj, Gurgaon (IN); Ambuj Kumar Mishra, Gurgaon (IN); Anurag Katiyar, Gurgaon (IN); Anurag Jain, Gurgaon (IN); Manoj Kumar Mishra, Gurgaon (IN); Aditya Sharma, Gurgaon (IN)

(73) Assignee: SRF LIMITED, Gurgaon (IN)

( * ) Notice: Subject to any disclaimer, the term of this patent is extended or adjusted under 35 U.S.C. 154(b) by 0 days.

(21) Appl. No.: 17/054,892

(22) PCT Filed: May 15, 2019

(86) PCT No.: PCT/IN2019/050388
§ 371 (c)(1),
(2) Date: Nov. 12, 2020

(87) PCT Pub. No.: WO2019/220460
PCT Pub. Date: Nov. 21, 2019

(65) Prior Publication Data
US 2021/0261842 A1  Aug. 26, 2021

(30) Foreign Application Priority Data

May 15, 2018 (IN) .............................. 201811018179
May 16, 2018 (IN) .............................. 201811018315
May 16, 2018 (IN) .............................. 201811018316
May 16, 2018 (IN) .............................. 201811018317

(51) Int. Cl.
*C09K 5/04* (2006.01)
(52) U.S. Cl.
CPC ........ *C09K 5/045* (2013.01); *C09K 2205/126* (2013.01); *C09K 2205/22* (2013.01); *C09K 2205/32* (2013.01)

(58) Field of Classification Search
CPC .............. C09K 2205/126; C09K 5/045; C09K 2205/22; C09K 2205/32; C09K 5/04; C09K 5/041; C09K 5/044; C09K 2205/122; C08J 9/143; C08J 9/144; C08J 9/146; C08J 9/149; C11D 7/50; C11D 7/5018; C11D 7/5036; C11D 7/504; C11D 7/505
See application file for complete search history.

(56) References Cited

U.S. PATENT DOCUMENTS

| | | | |
|---|---|---|---|
| 7,524,805 B2 | 4/2009 | Singh et al. | |
| 8,486,294 B2 * | 7/2013 | Rached ................. | C09K 5/045 252/67 |
| 8,592,538 B2 | 11/2013 | Thomas et al. | |
| 9,023,233 B2 | 5/2015 | Furuta et al. | |
| 9,574,123 B2 * | 2/2017 | Shibanuma ............ | C09K 5/044 |
| 2006/0243945 A1 * | 11/2006 | Minor .................... | C09K 5/045 252/67 |
| 2016/0244651 A1 * | 8/2016 | Leck ...................... | C09K 5/045 |

FOREIGN PATENT DOCUMENTS

| | | | |
|---|---|---|---|
| AU | 2009316676 A1 | | 5/2010 |
| AU | 2017201538 A1 | * | 3/2017 |
| CN | 102516946 A | * | 6/2012 |

\* cited by examiner

*Primary Examiner* — Matthew R Diaz
(74) *Attorney, Agent, or Firm* — Blank Rome LLP

(57) ABSTRACT

The present invention provides azeotropic or azeotrope-like compositions comprising 1234yf and at least one component selected from a group comprising of R-134, and R-134a. The compositions of the present invention are useful as refrigerants, heat transfer fluids, foam blowing agents, aerosol propellants, and fire suppression and fire extinguishing agents.

9 Claims, No Drawings

AZEOTROPE OR AZEOTROPE LIKE COMPOSITIONS COMPRISING 1234YF

CROSS REFERENCE TO RELATED APPLICATIONS

This application is a national phase of PCT application No. PCT/IN2019/050388, filed May 15, 2019, which claims priority to IN patent application No. 201811018179, filed May 15, 2018, IN patent application No. 201811018315, filed May 16, 2018, IN patent application No. 201811018316, filed May 16, 2018, IN patent application No. 201811018317, filed May 16, 2018, all of which are incorporated herein by reference thereto.

FIELD OF THE INVENTION

The present invention provides azeotropic or azeotrope-like compositions comprising 1234yf and at least one component selected from a group comprising of R-134, and R-134a.

BACKGROUND OF THE INVENTION

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential.

Most commercial refrigerants, which are now used, are pure fluids or azeotropes, many of these refrigerants have ozone depletion potentials when released to the atmosphere.

Many azeotropes possess properties that make them useful as refrigerants, blowing agents, propellants, solvents, and the like. For example, azeotropes have a constant boiling point that avoids boiling temperature drift during processing and use.

U.S. Pat. No. 7,524,805 discloses an azeotrope-like composition consisting essentially of effective amounts of trans-1,3,3,3-tetrafluoropropene (trans HFO-1234ze) and a compound selected from the group consisting of 1,1-difluoroethane ("R-152a"), 1,1,1,2,3,3,3-heptafluoropropane ("R-227ea"), 1,1,1,2-tetrafluoroethane ("R-134a"), 1,1,1,2,2-pentafluoroethane ("R-125") and combinations of two or more of these.

U.S. Pat. No. 8,592,538 discloses an azeotropic or azeotrope-like composition comprising chloromethane and at least one hydrofluorocarbon or hydrofluoro-olefin is selected from the group consisting of 1,1,1,3-tetrafluoroethane (54-81% by wt.) or 1,3,3,3-tetrafluoropropene (47-99.7% by wt.).

U.S. Pat. No. 9,023,233 discloses an azeotropic composition comprising 63 mole % of 2,3,3,3-tetrafluoropropene and 37 mole % of chloromethane.

U.S. Pat. No. 9,574,123 discloses a refrigerant composition comprising R and HFO, wherein the composition comprises: 1) R-32, R-125, R-134a, and R-134 as the R; 2) at least one of HFO-1234yf and HFO-1234ze as the HFO; and 3) at least one member selected from the group consisting of HCC-40, HCFC-22, HCFC-124, CFC-115, HCFC-1122, CFC-1113, and 3,3,3-trifluoropropyne as a third component.

The above said patent is silent about azeotropic or azeotrope-like compositions. The identification of new, environmentally-safe, non-fractionating mixtures that are commercially useful is complicated due to the fact that azeotrope formation is not readily predictable. Therefore, industry is continually looking for new azeotrope and azeotrope like mixtures, particularly for combinations of compounds having low Global Warming Potential (GWP).

This fact obviously complicates the search for new azeotropes which have application in the field. Nevertheless, there is a constant effort in the art to discover new azeotropic compositions, which have desirable characteristics.

Azeotropic or azeotrope like composition of the present invention comprising HFO and at least one R satisfies this need among others.

OBJECT OF THE INVENTION

The object of present invention is to provide a composition comprising 1234yf and at least one component selected from a group consisting of R-134, and R-134a.

SUMMARY OF THE INVENTION

The present invention provides a composition comprising R-1234yf, R-134a and R-134.

The present invention provides a composition comprising R-1234yf and R-134. The present invention provides a composition comprising R-1234yf and R-134a.

DETAILED DESCRIPTION OF THE INVENTION

As used herein, the term R-1234yf refers to 2,3,3,3-Tetrafluoropropene; R-134a refers to 1,1,1,2-Tetrafluoroethane; R-134 refers to 1,1,2,2-Tetrafluoroethane; R-1243zf refers to 3,3,3-Trifluoroprop-1-ene; R-32 refers to Difluoromethane; R-125 refers to 1,1,1,2,2-Pentafluoroethane; R-143a refers to 1,1,1-Trifluoroethane; R-152a refers to 1,1-Difluoroethane; R-161 refers to Monofluoroethane; R-227ea refers to 1,1,1,2,3,3,3-Heptafluoropropane; R-236ea refers to 1,1,1,2,3,3-Hexafluoropropane; R-236fa refers to 1,1,1,3,3,3-Hexafluoropropane; R-245fa refers to 1,1,1,3,3-Pentafluoropropane; R-600a refers to isobutane; R-600 refers to n-butane and R-365mfc refers to 1,1,1,3,3-Pentafluorobutane. As used herein, the term "azeotrope or azeotrope-like" is intended in its broad sense to include both compositions that are strictly azeotropic and compositions that behave like azeotropic mixtures. An azeotropic mixture is a system of two or more components in which the liquid composition and vapor composition are equal at the stated pressure and temperature. In practice, this means that the components of an azeotropic mixture are constant boiling and cannot be separated during a phase change. The azeotrope-like compositions of the invention may include additional components that do not form new azeotrope-like systems.

The present invention provides an azeotropic or azeotrope-like composition comprising R-1234yf and at least one selected from R-134 or R-134a.

The present invention provides an azeotropic or azeotrope-like composition comprising R-1234yf and R-134.

In one embodiment, present invention relates to a composition comprising about 50 mole % to about 99 mole % of R-1234yf, and about 1 mole % to about 50 mole % R-134.

In another embodiment, present invention relates to a binary azeotropic or azeotrope-like composition comprising about 80 mole % to about 98 mole % of R-1234yf, and about 2 mole % to about 20 mole % R-134.

In another embodiment, the binary azeotropic composition further comprising a lubricant selected from the group consisting of polyol esters, polyalkylene glycols, polyvinyl ethers, mineral oil, alkylbenzenes, synthetic paraffins, synthetic naphthenes, and poly(alpha)olefins.

In another embodiment, the binary azeotropic compositions of the present invention are useful in processes for producing cooling or heat, as heat transfer fluids, refrigerants, foam blowing agents, aerosol propellants, and fire suppression and fire extinguishing agents.

In another embodiment, the present invention provides a refrigerant composition comprising an azeotropic composition comprising 80 mole % to about 98 mole % of R-1234yf, and about 2 mole % to about 20 mole % R-134.

In another embodiment, present invention relates to a binary azeotropic or azeotrope-like composition comprising about 90 mole % of R-1234yf, and about 10 mole % R-134.

In another embodiment, the binary azeotropic composition has GWP of less than 1500.

In another embodiment, the binary azeotropic composition has GWP of less than 750.

In another embodiment, the binary azeotropic composition has GWP of less than 500.

In another embodiment, the present invention provides a refrigerant composition comprising R-1234yf, R-134 that can be near azeotropic composition or zeotropic composition.

In another embodiment, the present invention provides a composition comprising R-1234yf, R-134 and one or more additional component selected from a group consisting of R-1234ye, R-1243zf, R-32, R-125, R-134a, R-143a, R-152a, R-161, R-227ea, R-236ea, R-236fa, R-245fa, R-365mfc, propane, n-butane, isobutane, 2-methylbutane, n-pentane.

In another embodiment, the composition comprising R-1234yf, R-134 and R-32.

In another embodiment, a refrigerant composition comprising 30% to 60% of R-1234yf, 4% to 15% of R-134 and 20% to 65% of R-32.

In another embodiment, the composition comprising R-1234yf, R-134 and R-32.

In another embodiment, a refrigerant composition comprising 40% to 45% of R-1234yf, 4% to 6% of R-134 and 50% to 55% of R-32 wherein the composition has GWP less than 750.

In another embodiment, the composition comprising R-1234yf, R-134, R-32 and R-152a. In another embodiment, a refrigerant composition comprising 40% to 45% of R-1234yf, 4% to 6% of R-134, 20% to 65% of R-32 and 2% to 15% of R-152a.

In another embodiment, the composition comprising R-1234yf, R-134, R-32 and R-125. In another embodiment, a refrigerant composition comprising 40% to 45% of R-1234yf, 4% to 6% of R-134, 20% to 65% of R-32 and 2% to 15% of R-125.

In another embodiment, the composition comprising R-1234yf, R-134, R-32, R-152a, and R-143a. In another embodiment, a refrigerant composition comprising 40% to 45% of R-1234yf, 4% to 6% of R-134, 20% to 65% of R-32, 2% to 15% of 152a and 2% to 10% of R-143a.

In another embodiment, the composition comprising R-1234yf, R-134, R-32, R-152a, and R-125. In another embodiment, a refrigerant composition comprising 40% to 45% of R-1234yf, 4% to 6% of R-134, 20% to 65% of R-32, 2% to 15% of 152a and 2% to 10% of R-125.

In another embodiment, the composition comprising R-1234yf, R-134, R-32, R-600a, and R-125. In another embodiment, a refrigerant composition comprising 40% to 45% of R-1234yf, 4% to 6% of R-134, 20% to 65% of R-32, 2% to 15% of 600a and 2% to 10% of R-125.

In another embodiment, the composition comprising R-1234yf, R-134, R-32, R-227ea, and R-125. In another embodiment, a refrigerant composition comprising 40% to 45% of R-1234yf, 4% to 6% of R-134, 20% to 65% of R-32, 2% to 15% of 227ea and 2% to 10% of R-125.

In another embodiment, a refrigerant composition comprising R-1234yf, R-134 and R-152a. In another embodiment, a refrigerant composition comprising 30% to 80% of R-1234yf, 4% to 15% of R-134 and 5% to 55% of R-152a.

In another embodiment, the composition comprising R-1234yf, R-134 and additional component has GWP of less than 1500.

In another embodiment, the composition comprising R-1234yf, R-134 and additional component has GWP of less than 750.

In another embodiment, the composition comprising R-1234yf, R-134 and additional component has GWP of less than 500.

In another embodiment, the composition comprising R-1234yf, R-134 and additional component further comprises a lubricant selected from the group consisting of polyol esters, polyalkylene glycols, polyvinyl ethers, mineral oil, alkylbenzenes, synthetic paraffins, synthetic naphthenes, and poly(alpha)olefins.

In another embodiment, the compositions comprising R-1234yf, R-134 and additional component of the present invention are useful in processes for producing cooling or heat, as heat transfer fluids, foam blowing agents, aerosol propellants, and fire suppression and fire extinguishing agents.

In another embodiment, the present invention provides a refrigerant composition comprising R-1234yf, R-134a, and one or more additional component selected from R-1234ye, R-1243zf, R-32, R-125, R-143a, R-152a, R-161, R-227ea, R-236ea, R-236fa, R-245fa, R-365mfc, propane, n-butane, isobutane, 2-methylbutane, n-pentane.

In another embodiment, the present invention provides a composition comprising 10 mole % to 55 mole % of R-134a and 35 mole % to 90 mole % of 1234yf.

In another embodiment, the present invention provides a refrigerant composition comprising 10 mole % to 35 mole % of R-134a and 60 mole % to 90 mole % of 1234yf, and one or more additional component selected from R-1234ye, R-1243zf, R-32, R-125, R-143a, R-152a, R-161, R-227ea, R-236ea, R-236fa, R-245fa, R-365mfc, propane, n-butane, isobutane, 2-methylbutane, n-pentane.

In another embodiment, the present invention provides an azeotropic or azeotrope like composition comprising R-1244yf, R-134 and additionally R-134a.

In another embodiment, the present invention provides a composition comprising about 35 mole % to 80% mole % of 1234yf, about 1 mole % to about 49% of R-134a and about 1 mole % to about 49% of R-134.

In another embodiment, the present invention provides ternary azeotropic or azeotrope like composition comprising about 65 mole % to 85 mole % of 1234yf, about 4 mole % to about 20% of R-134a and about 5 mole % to about 15% of R-134.

In another embodiment, the composition comprising R-1234yf, R-134, R-134a and additional component further comprises a lubricant selected from the group consisting of polyol esters, polyalkylene glycols, polyvinyl ethers, mineral oil, alkylbenzenes, synthetic paraffins, synthetic naphthenes, and poly(alpha)olefins.

In another embodiment, the compositions comprising R-1234yf, R-134 and R-134a of the present invention are useful in processes for producing cooling or heat, as heat transfer fluids, foam blowing agents, aerosol propellants, and fire suppression and fire extinguishing agents.

In another embodiment, the present invention provides a refrigerant comprising an azeotropic composition comprising R-1234yf, R-134, and R-134a.

In another embodiment, the compositions comprising R-1234yf, R-134, and R-134a has GWP of less than 1500.

In another embodiment, the compositions comprising R-1234yf, R-134, and R-134a has GWP of less than 750.

In another embodiment, the compositions comprising R-1234yf, R-134, and R-134a has GWP of less than 500.

In another embodiment, the present invention provides a composition comprising R-1234yf, R-134a, R-134 and further comprises one or more additional component selected from R-1234ye, R-1243zf, R-32, R-125, R-143a, R-152a, R-161, R-227ea, R-236ea, R-236fa, R-245fa, R-365mfc, propane, n-butane, isobutane, 2-methylbutane, n-pentane.

In another embodiment, the present invention provides a composition comprising R-1234yf, R-134a, R-134, and R-32.

In another embodiment, a refrigerant composition comprising 40% to 45% of R-1234yf, 2% to 6% of R-134, 5% to 45% 134a and 10% to 45% of R-32.

In another embodiment, a refrigerant composition comprising 40% to 45% of R-1234yf, 4% to 6% of R-134, 5% to 45% 134a and 2% to 10% of R-600a.

In another embodiment, a refrigerant composition comprising 40% to 45% of R-1234yf, 4% to 6% of R-134, 5% to 45% 134a, 25 to 10% of R-600a and 2% to 10% of R-125.

In another embodiment, the composition comprising R-1234yf, R-134, R-134a, R-32, R-152a, and R-143a. In another embodiment, a refrigerant composition comprising 40% to 45% of R-1234yf, 4% to 6% of R-134, 5% to 35% of 134a, 20% to 65% of R-32, 2% to 15% of 152a and 2% to 10% of R-143a.

In another embodiment, the composition comprising R-1234yf, R134a, R-134, R-32, and R-152a. In another embodiment, a refrigerant composition comprising 30% to 65% of R-1234yf, 4% to 8% of R-134, 5% to 50% of 134a, 20% to 65% of R-32, 2% to 25% of 152a.

In another embodiment, the composition comprising R-1234yf, R-134, R-32, R-134a, and R-125. In another embodiment, a refrigerant composition comprising 40% to 45% of R-1234yf, 4% to 6% of R-134, 5% to 35% of 134a, 20% to 65% of R-32, and 2% to 10% of R-125.

In another embodiment, the composition comprising R-1234yf, R-134, R-32, R-134a, and R-227ea. In another embodiment, a refrigerant composition comprising 40% to 45% of R-1234yf, 4% to 6% of R-134, 5% to 35% of 134a, 20% to 65% of R-32, and 2% to 10% of R-227ea.

In another embodiment, the composition comprising R-1234yf, R-134, R-32, R-134a, and R-600a. In another embodiment, a refrigerant composition comprising 40% to 45% of R-1234yf, 4% to 6% of R-134, 5% to 35% of 134a, 20% to 65% of R-32, and 2% to 10% of R-600a.

In another embodiment, the compositions comprising R-1234yf, R-134 and R-134a further comprises a lubricant selected from the group consisting of polyol esters, polyalkylene glycols, polyvinyl ethers, mineral oil, alkylbenzenes, synthetic paraffins, synthetic naphthenes, and poly(alpha) olefins.

In another embodiment, the composition comprising R-1234yf, R-134a, R-134 and additional component has GWP of less than 1500.

In another embodiment, the composition comprising R-1234yf, R-134a, R-134 and additional component has GWP of less than 750.

In another embodiment, the composition comprising R-1234yf, R-134a, R-134 and additional component has GWP of less than 500.

In another embodiment the composition comprising R-1234yf, R-134a, R-134 and additional component are useful in processes for producing cooling or heat, as heat transfer fluids, foam blowing agents, aerosol propellants, and fire suppression and fire extinguishing agents.

The compositions of the present invention can specifically be prepared by reaction of difluorochloromethane (R-22)/tetrafluoroethene (TFE) and chloromethane (R-40)/methane. The reaction of difluorochloromethane (R-22)/tetrafluoroethene (TFE) and chloromethane (R-40)/methane may be carried out in the presence of initiator selected from from the group consisting of carbon tetrachloride, hexachloroethane, trichloroacetylchloride, chloroform, phosgene, thionyl chloride, sulfonyl chloride, trichloromethylbenzene, organic hypochlorites and inorganic hypochlorites or mixture thereof.

The reaction of difluorochloromethane (R-22)/tetrafluoroethene (TFE) and chloromethane (R-40)/methane is carried out at a temperature in the range of 500 to 850° C.

The azeotropic or azeotrope-like compositions of the present invention are isolated from the outlet composition that obtained from the reaction of TFE and R40.

The present compositions have utility in a wide range of applications. For example, one embodiment of the present invention relates to blowing agent, heat transfer compositions, aerosol and cleaning, and refrigerant compositions comprising the present azeotrope-like compositions.

In another embodiment of this aspect of the present invention, the azeotrope or azeotrope like composition additionally comprises of about less than 0.5% of non-absorbable gases.

In another embodiment of this aspect of the present invention, the refrigerant composition may contain optional components selected from the group consisting of lubricants, dyes (including Ultra Violet dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional other components fit into one or more of these categories and may have qualities that lend themselves to achieve one or more performance characteristic.

In another embodiment of this aspect, the present invention provides a refrigeration process using the refrigerant composition of the present invention comprising the steps of:

a) Condensing the refrigerant composition;

b) Evaporating the refrigerant composition.

These compositions of the present invention tend to exhibit relatively low global warming potentials ("GWPs").

It is against this and other backgrounds, which shall be filed in a detailed manner in complete specifications, in due course, the present invention is brought out and explained in following non-limiting examples.

EXAMPLES

The azeotrope or azeotrope-like composition of the invention can be used as refrigerant compositions and tested with standard ASHRAE modeling program maintaining indoor at 27° C. dry bulb temperature (DBT) and 19° C. wet bulb temperature (WBT) and outdoor at 35 DBT and 24 WBT.

The refrigerant compositions of the present invention are enlisted in Table 1

The comparison of the compositions of the present inventions with R-22 is listed in Table 2. The comparison of the present inventions with R-404 is listed in Table 3.

TABLE 1

All quantities are calculated as Mass %

| Comp | R1234yf | R134 | R134a | R32 | R125 | R152a | R600 | R227ea | R143A | GWP |
|---|---|---|---|---|---|---|---|---|---|---|
| 1 | 65.16 | 7.24 | | 22.00 | 5.00 | | 0.60 | | | 391 |
| 2 | 58.50 | 6.50 | | 22.00 | 8.00 | | | 5.00 | | 645 |
| 3 | 58.50 | 6.50 | | 22.00 | 8.00 | 5.00 | | | | 484.5 |
| 4 | 54.00 | 6.00 | | 9.70 | 10.00 | 10.30 | | | 10.00 | 946 |
| 5 | 63.00 | 7.00 | | 30.00 | | | | | | 284 |
| 6 | 63.00 | 7.00 | | 28.00 | | 2.00 | | | | 273 |
| 7 | 36.00 | 4.00 | | 30.00 | 30.00 | | | | | 1200 |
| 8 | 54.00 | 6.00 | | 30.00 | 10.00 | | | | | 589.5 |
| 9 | 64.80 | 7.20 | | 23.00 | 5.00 | | | | | 397.5 |
| 10 | 48.00 | 3.00 | | 36.00 | 13.00 | | | | | 691 |
| 11 | 57.85 | 6.40 | | 35.75 | | | | | | 316 |
| 12 | 64.80 | 7.20 | | 22.00 | 4.00 | | 2.00 | | | 359 |
| 13 | 48.50 | 7.20 | 8 | 26.30 | | 10.00 | | | | 378.5 |
| 14 | 42.50 | 4.72 | 18 | 27.78 | 7.00 | | | | | 698.5 |
| 15 | 38.00 | 4.22 | 18 | 31.78 | | | 8.00 | | | 498 |
| 16 | 42.50 | 4.72 | 25 | 22.00 | | | | 5.78 | | 722 |
| 17 | 38.00 | 4.22 | 15 | 37.78 | 5.00 | | | | | 658 |
| 18 | 48.50 | 5.39 | 46.11 | | | | | | | 661 |
| 19 | 34.00 | 3.78 | 18 | 44.22 | | | | | | 577 |
| 20 | 34.00 | 3.78 | 16 | 18.00 | | 28.22 | | | | 412.5 |

TABLE 2

| Refrigerant compositions | Cooling Capacity | Quantity Charged | Power Consumption | COP | ODP | GWP |
|---|---|---|---|---|---|---|
| R22 | 100% | 100% | 100% | 100% | 0.055 | 1760 |
| Composition 1 | 105.1 | 100 | 100.2 | 104.8 | 0 | 391 |
| Composition 2 | 103.2 | 100 | 101.1 | 102.0 | 0 | 645 |
| Composition 3 | 102.1 | 100 | 100.8 | 101.2 | 0 | 484.5 |

TABLE 3

| Refrigerant compositions | Cooling Capacity | Quantity Charged | Power Consumption | COP | ODP | GWP |
|---|---|---|---|---|---|---|
| R404A | 100% | 100% | 100% | 100% | 0 | 3922 |
| Composition 7 | 105.9 | 100 | 114.7 | 92.22 | 0 | 1200 |
| Composition 8 | 99.1 | 100 | 101.2 | 97.92 | 0 | 589.5 |
| Composition 9 | 97 | 100 | 95.2 | 101.9 | 0 | 397.5 |

The comparative data for enthalpy of evaporation is given in Table-4 below.

TABLE 4

| Refrigerant | Molar mass (Kg/Kmol) | | Enthalpy (kj/kg) | |
|---|---|---|---|---|
| | at −25° C. in vapour phase | at 25° C. in liquid phase | at −25°C in vapour phase | at 25° C. in liquid phase |
| R404a | 97.604 | 97.604 | 352.33 | 236.3 |
| R22 | 86.46 | 86.46 | 394.9 | 230.29 |
| Composition 1 | 89.51 | 89.51 | 377.49 | 236.92 |
| Composition 2 | 91.27 | 91.27 | 374.36 | 236.46 |
| Composition 3 | 87.57 | 87.57 | 361.59 | 237.16 |
| Composition 4 | 101.24 | 101.24 | 354.32 | 234.81 |
| Composition 5 | 83.49 | 83.49 | 366.86 | 237.85 |
| Composition 6 | 84.06 | 84.06 | 389.87 | 237.76 |
| Composition 7 | 84.63 | 84.63 | 383.67 | 237.58 |
| Composition 8 | 83.87 | 83.87 | 387.84 | 237.75 |
| Composition 9 | 89.08 | 89.08 | 378.51 | 236.89 |
| Composition 10 | 79.96 | 79.96 | 395.45 | 238.49 |
| Composition 11 | 79.54 | 79.54 | 398.64 | 238.57 |
| Composition 12 | 88.54 | 88.54 | 378.73 | 237.32 |
| Composition 13 | 81.22 | 81.22 | 403.06 | 238.26 |
| Composition 14 | 84.2 | 84.2 | 392.39 | 237.49 |
| Composition 15 | 76.95 | 76.95 | 404.99 | 240.31 |
| Composition 16 | 89.22 | 89.22 | 385.28 | 236.54 |
| Composition 17 | 77.55 | 77.55 | 407.39 | 238.72 |
| Composition 18 | 107.52 | 107.52 | 378.51 | 248.37 |
| Composition 19 | 73.44 | 73.44 | 420.21 | 239.51 |
| Composition 20 | 79.04 | 79.04 | 419.59 | 238.99 |

As depicted in the Tables above, the refrigerant compositions of the present invention exhibit good cooling capacity and will operate in substantially the same manner as the legacy R22 and 404A refrigerant under the same conditions. The performance factor is almost close to R22 and have ZERO ODP and very low GWP.

The refrigerant composition of the present invention has higher specific heat capacity as given in Table-5 below. Cp (Specific Heat in constant pressure) is the amount of heat required to increase temperature by 1° C. when heat is given at constant pressure, Cv (Specific heat in constant volume) means the amount of heat required to increase temperature by 1° C., when heat is given at constant volume.

TABLE-5

| Refrigerant | Cp/Cv at −25° C. in liquid phase | Cp/Cv at −25° C. in vapour phase | Cp/Cv at 25° C. in liquid phase |
|---|---|---|---|
| R404a | 1.5327 | 1.1859 | 1.6678 |
| R22 | 1.690 | 1.249 | 1.819 |
| Composition 1 | 1.5413 | 1.1842 | 1.673 |
| Composition 2 | 1.5409 | 1.1825 | 1.671 |
| Composition 3 | 1.5445 | 1.188 | 1.673 |
| Composition 4 | 1.5186 | 1.1637 | 1.625 |
| Composition 5 | 1.5626 | 1.202 | 1.713 |
| Composition 6 | 1.5569 | 1.1981 | 1.700 |
| Composition 7 | 1.5788 | 1.2157 | 1.744 |
| Composition 8 | 1.568 | 1.2061 | 1.723 |
| Composition 9 | 1.5444 | 1.1866 | 1.679 |
| Composition 10 | 1.5865 | 1.223 | 1.759 |
| Composition 11 | 1.5798 | 1.2165 | 1.744 |
| Composition 12 | 1.5404 | 1.1839 | 1.671 |
| Composition 13 | 1.5576 | 1.1999 | 1.684 |
| Composition 14 | 1.5674 | 1.2027 | 1.704 |
| Composition 15 | 1.5728 | 1.2097 | 1.716 |
| Composition 16 | 1.5473 | 1.1853 | 1.661 |
| Composition 17 | 1.5948 | 1.2259 | 1.754 |
| Composition 18 | 1.5106 | 1.1706 | 1.580 |
| Composition 19 | 1.6126 | 1.2397 | 1.779 |
| Composition 20 | 1.5422 | 1.1926 | 1.638 |

The invention claimed is:

1. A composition comprising about 30% to 65% of R-1234yf, about 2% to 15% of R-134, about 2% to 15% of R-152a and about 15% to 45% of R-32, wherein all percentages are in mole %.

2. The composition as claimed in claim 1 further comprising a lubricant selected from the group consisting of polyol esters, polyalkylene glycols, polyvinyl ethers, mineral oil, alkylbenzenes, synthetic paraffins, synthetic naphthenes, and poly(alpha)olefins.

3. The composition as claimed in claim 1, wherein the composition has a GWP of less than 1500.

4. The composition as claimed in claim 1, wherein the composition is useful as a heat transfer fluid, a refrigerant, a foam blowing agent, an aerosol propellant, a fire suppression agent, and a fire extinguishing agent.

5. The composition as claimed in claim 1, wherein the composition comprises about 30% to 65% of R-1234yf, about 2% to 15% of R-134, about 2% to 15% of R-152a and about 20% to 45% of R-32, wherein all percentages are in mole %.

6. A composition comprising about 30% to 65% of R-1234yf, about 2% to 15% of R-134, about 5% to 45% of R-134a and about 2% to 15% of R-152a, wherein all percentages are in mole %.

7. The composition as claimed in claim 6, further comprising a lubricant selected from the group consisting of polyol esters, polyalkylene glycols, polyvinyl ethers, mineral oil, alkylbenzenes, synthetic paraffins, synthetic naphthenes, and poly(alpha)olefins.

8. The composition as claimed in claim 6, wherein the composition has a GWP of less than 1500.

9. The composition as claimed in claim 6, wherein the composition is useful as a heat transfer fluid, a refrigerant, a foam blowing agent, an aerosol propellant, a fire suppression agent, and a fire extinguishing agent.

* * * * *